United States Patent
Mochizuki et al.

(10) Patent No.: US 9,140,424 B2
(45) Date of Patent: Sep. 22, 2015

(54) VEHICLE HEADLAMP

(71) Applicant: KOITO MANUFACTURING CO., LTD., Tokyo (JP)

(72) Inventors: Kiyotaka Mochizuki, Shizuoka (JP); Akinori Matsumoto, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 89 days.

(21) Appl. No.: 13/961,914

(22) Filed: Aug. 8, 2013

(65) Prior Publication Data

US 2014/0043842 A1    Feb. 13, 2014

(30) Foreign Application Priority Data

Aug. 10, 2012   (JP) .................. 2012-178696

(51) Int. Cl.
  *F21S 8/10*   (2006.01)
  *B60Q 1/14*   (2006.01)

(52) U.S. Cl.
  CPC ................. *F21S 48/17* (2013.01); *B60Q 1/143* (2013.01); *B60Q 2300/056* (2013.01); *B60Q 2300/41* (2013.01); *B60Q 2300/42* (2013.01)

(58) Field of Classification Search
  CPC ....... F21S 48/17; F21S 48/11; F21S 48/1145; F21S 48/115; F21S 48/1748; F21S 48/1705; F21S 48/171; F21S 8/10; B60Q 1/04; B60Q 1/143; B60Q 2300/41; B60Q 2300/42; B60Q 2300/056
  USPC .......................................... 362/543
  See application file for complete search history.

(56) References Cited

U.S. PATENT DOCUMENTS

| | | | | |
|---|---|---|---|---|
| 5,796,094 | A  * | 8/1998 | Schofield et al. | 250/208.1 |
| 6,891,333 | B2 | 5/2005 | Tatsukawa et al. | |
| 7,744,261 | B2 * | 6/2010 | Fukawa et al. | 362/543 |
| 2005/0024889 | A1 * | 2/2005 | Sugimoto | 362/539 |
| 2014/0029289 | A1 * | 1/2014 | Mochizuki et al. | 362/525 |

FOREIGN PATENT DOCUMENTS

| | | |
|---|---|---|
| JP | 2004095480 A | 3/2004 |
| JP | 2007134052 A | 5/2007 |

* cited by examiner

*Primary Examiner* — Bao Q Truong
(74) *Attorney, Agent, or Firm* — Osha Liang LLP (57) ABSTRACT

A multi-lamp type vehicle headlamp is configured to combine illumination by a first lamp unit and illumination by second lamp units so as to provide a low beam light distribution function and a high beam light distribution function. The first lamp unit is configured to form at least a cutoff line of a light distribution pattern for a low beam. The second lamp units have a resolution that is lower than that of an illumination region which can be provided by the first lamp unit.

16 Claims, 9 Drawing Sheets

VEHICLE HEADLAMP

CROSS REFERENCE TO RELATED APPLICATION(S)

This application is based on and claims priority under 35 U.S.C. §119 to Japanese Patent Application Nos. 2012-178696 (filed on Aug. 10, 2012), the entire contents of which are incorporated herein by reference.

BACKGROUND

1. Technical Field

The invention relates to a vehicle headlamp that changes a light distribution pattern in response to environments under which a vehicle travels.

2. Description of the Related Art

A vehicle headlamp of a multi-lamp type including plural lamp units each of which has an inherent light distribution characteristic has been known. In such a vehicle headlamp, plural lamps are selectively turned on, and illumination light of the turned-on lamps are integrated, to thereby form light distribution patterns having pattern shapes and/or light intensity distributions which are adapted to a variety of vehicle traveling situations (see, for example, JP 2004-95480 A (corresponding to U.S. Pat. No. 6,891,333) and JP 2007-134052 A (corresponding to U.S. Pat. No. 7,744,261)).

SUMMARY

However, if ADB (Adaptive Driving Beam) control is carried out in the vehicle headlamps described in JP 2004-95480 A and JP 2007-134052 A, it is difficult to finely adjust widths of an illumination region in vertical and horizontal directions (resolution thereof is coarse). In order to enhance the resolution, the number of the mounted lamp units may be increase. However, it results in increase of cost.

The invention has been made in view of the above-described circumstances and provides technology that enhances resolution of an illumination region of at least one lamp unit in a vehicle head lamp of multi-lamp type, which combines illumination of two or more lamp units to realize a specific light distribution function, to thereby improve performance to follow a forward vehicle.

According to one embodiment, a vehicle headlamp includes a first lamp unit and a second lamp unit. The first lamp unit is configured to form at least a cutoff line of a light distribution pattern for a low beam. The second lamp unit has a resolution that is lower than that of an illumination region which can be provided by the first lamp unit. The vehicle headlamp is configured to combine illumination by the first lamp unit and illumination by the second lamp unit so as to provide a high beam light distribution function and a low beam light distribution function.

With this configuration, since the first lamp unit configured to form the cutoff line of the light distribution pattern for the low beam has the higher resolution than that of the second lamp unit, it is possible to finely change an illumination region near the cutoff line. Therefore, the performance of the control to follow the forward vehicle during execution of the ADB control is improved. In this specification, the term "resolution" means "fineness with which an area of an illumination region is increased/decreased (changed) when the illumination region is switched." Also, the cutoff line includes cutoff lines in horizontal/vertical/inclined directions.

The first lamp unit may be configured to continuously change a position of the cutoff line. The second lamp unit may be configured to change the illumination region in a stepwise manner. With this configuration, it is possible to smoothly change the illumination region near the cutoff line in accordance with movement of a forward vehicle.

Also, the first lamp unit may be configured to change a position of the cutoff line by driving an actuator. The second lamp unit may be configured to change the illumination region by individually turning on/off one or more sub lamp units.

Also, the illumination region by the first lamp unit may be higher in luminous intensity than an illumination region by the second lamp unit, or the illumination region by the first lamp unit may include a vicinity of a center of a virtual vertical screen that is arranged ahead of a vehicle. With these configurations, regions that are regulated by the law and regulations of respective countries are illuminated by the first lamp unit, so that restrictions on an illumination range or illuminance of the second lamp unit are reduced. Hence, the degrees of freedom of a shape of the second lamp unit, a size of the second lamp unit, and arrangement of the second lamp unit in the headlamp are enhanced.

Also, the illumination region by the first lamp unit may include both a region that should be illuminated when the high beam light distribution function is executed and a region that should be illuminated when the low beam light distribution function is executed.

According to the above configurations, in a multi-lump type vehicle headlamp that combines illumination by two or more lamp units to provide a specific light distribution function, it is possible to enhance a resolution of an illumination region of at least one lamp unit to thereby improve a property to follow a front vehicle.

DETAILED DESCRIPTION

Figure 1:
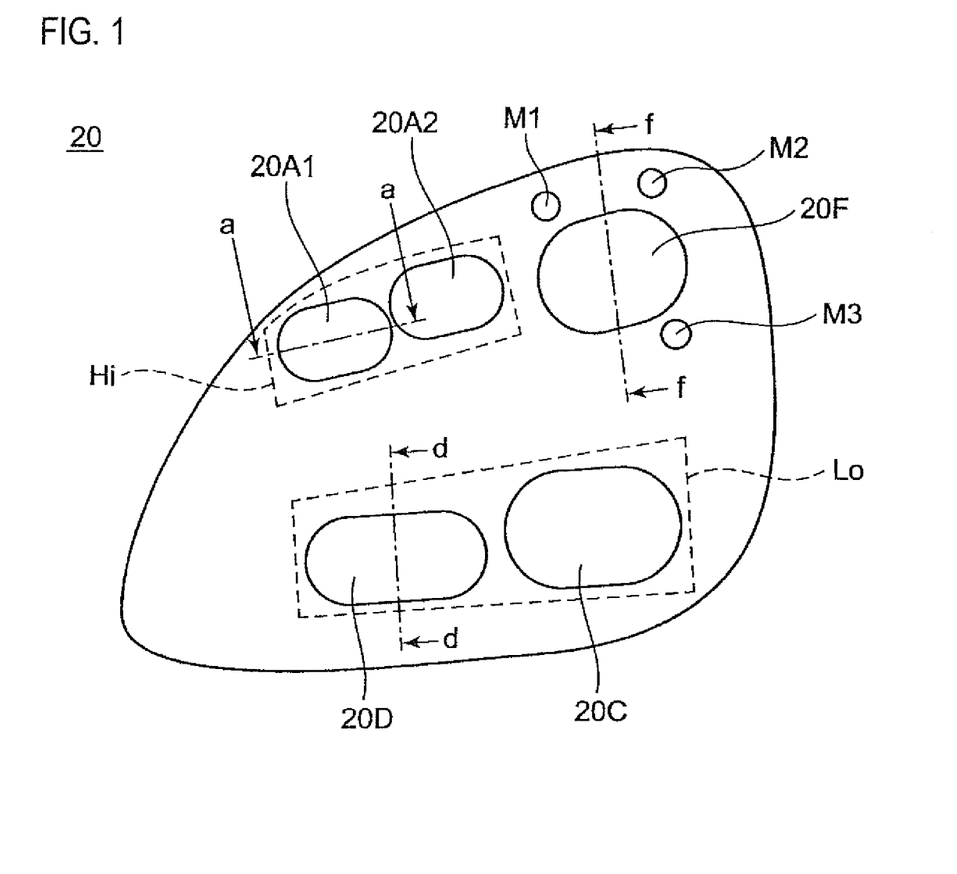
FIG. 1 is a schematic front view of a vehicle headlamp of a multi-lamp type according to one embodiment of the invention.

FIG. 1 is a schematic front view of a vehicle headlamp 20 of a multi-lamp type according to one embodiment of the invention. The multi-lamp type headlamp 20 includes a high beam diffusion unit 20A, a low beam large diffusion unit 20C, a low beam diffusion unit 20D and a mechanical-switching-type condensing unit 20F. The multi-lamp headlamp 20 is configured to combine individual light distribution patterns, which are formed by the respective lamp units, to thus form a variety of combined light distribution patterns and to realize optimal light distribution in various vehicle traveling environments.

In the meantime, the multi-lamp type headlamps 20 are arranged on both right and left sides of a vehicle body front part, respectively. Here, the multi-lamp type headlamp 20, which is located on the left when viewed from the vehicle front, will be mainly described. The right multi-lamp type headlamp has the same configuration as that of the left multi-lamp type headlamp, except that they are bilaterally symmetric. When it is necessary to distinguish the left and right multi-lamp type headlamps, a letter L or R is attached to an end of the reference numeral thereof.

The high beam diffusion units 20A1, 20A2 are provided in pair. The high beam diffusion units 20A are configured to illuminate, with diffusion light, both right and left sides of an individual light distribution pattern formed by the mechanical-switching-type condensing unit 20F when a high beam-combined pattern is formed (see FIG. 6).

The low beam diffusion unit 20D is configured to illuminate, with horizontal diffusion light, a lower side of the light distribution pattern formed by the mechanical-switching-type condensing unit 20F when the high beam-combined pattern or a low beam-combined pattern is formed (see FIG. 6).

The low beam large diffusion unit 20C is configured to illuminate a more left side (a more right side when the multi-lamp type headlamp 20 is arranged on the right side) of the diffusion light with which the low beam diffusion unit 20D illuminates. The illumination light from the low beam large diffusion unit 20C may be used as a clearance lamp.

The mechanical-switching-type condensing unit 20F illuminates near a center of a virtual vertical screen that is provided ahead of the vehicle. The mechanical-switching-type condensing unit 20F is configured to mechanically switch a plurality of individual light distribution patterns including at least an individual light distribution pattern for low beam and an individual light distribution pattern for high beam. A detailed structure of the mechanical-switching-type condensing unit 20F will be described later with reference to FIG. 4.

In this embodiment, the mechanical-switching-type condensing unit 20F illuminates a range that is largely influenced by law and/or regulations of respective countries regarding the light distribution of the vehicle headlamp, i.e., near the center of the virtual vertical screen, and the other lamp units 20A1, 20A2, 20C, 20D illuminate the other ranges. An example of the law and/or regulations that the mechanical-switching-type condensing unit 20F should satisfy will be described later with reference to FIG. 8.

Of the respective lamp units configuring the multi-lamp type headlamp 20, only the mechanical-switching-type condensing unit 20F is provided with an aiming mechanism for optical axis adjustment. In FIG. 1, aiming fulcrums M1 to M3 are schematically shown. At least two of the three aiming fulcrums are provided, so that the aiming adjustment can be performed it is possible to adjust the aiming of the condensing unit 20F in the upper/lower and right/left directions. A structure of the aiming mechanism will be described later with reference to FIG. 4.

Figure 2:
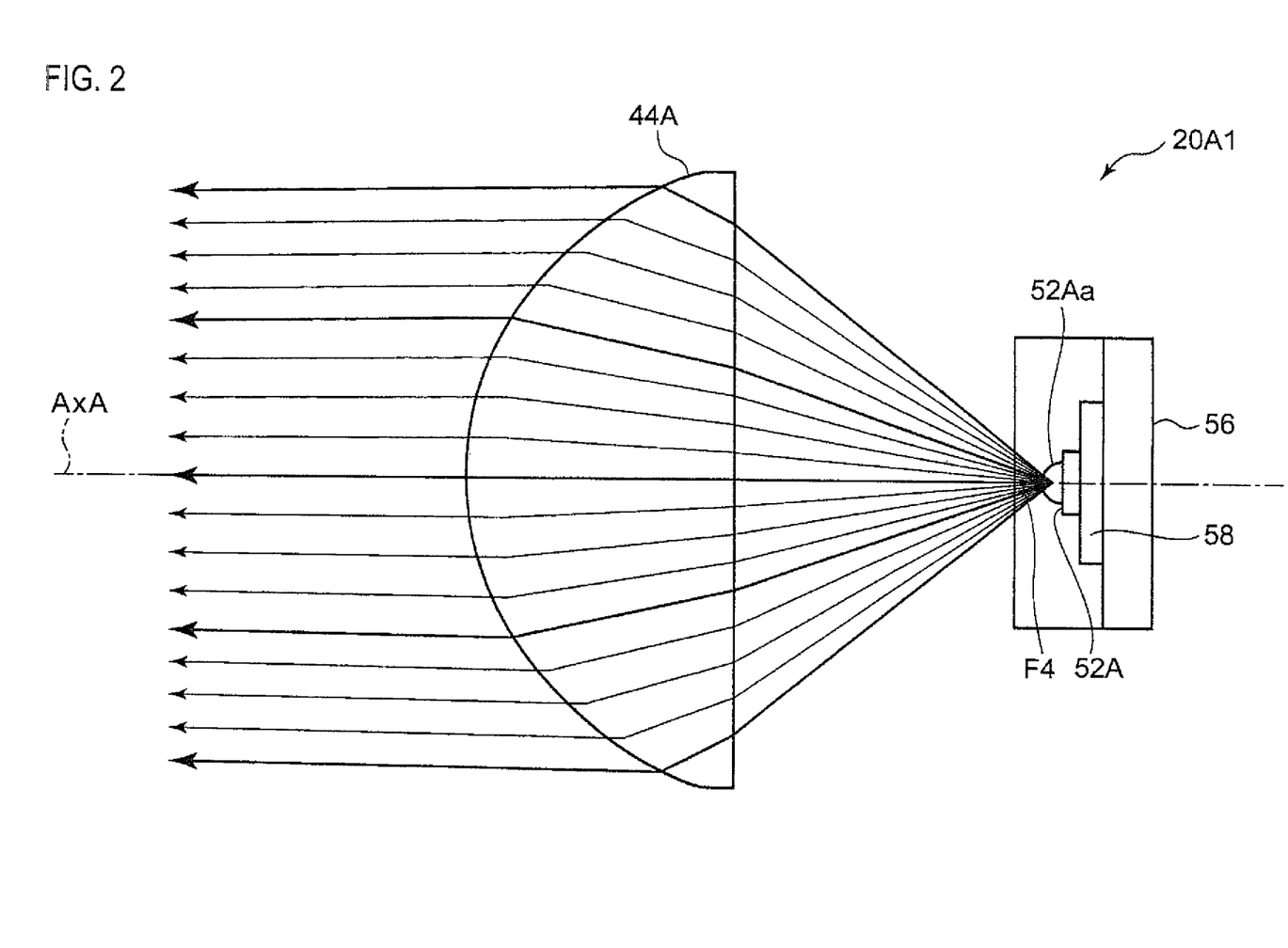
FIG. 2 is a plan section view of a high beam diffusion unit taken along a line a-a in FIG. 1.

FIG. 2 is a plan section view of the high beam diffusion unit 20A1 taken along a plane including a line a-a in FIG. 1 and extending in a front-rear direction of the vehicle. The high beam diffusion unit 20A1 has a semiconductor light emitting device (for example, light emitting diode) 52A as a light source.

The semiconductor light emitting device 52A is fixed to a support member 56 via a substrate 58 with a light emitting chip 52Aa being disposed on an optical axis AxA so as to be directed towards the front direction of the lamp.

A condensing lens 44A of the high beam diffusion unit 20A1 is a plano-convex aspheric lens having a convex front surface and a planar rear surface. The condensing lens 44A is disposed on the optical axis AxA so that a rear focal point F4 thereof is located on the optical axis Ax and is in front of the light emitting chip 52Aa.

In the high beam diffusion unit 20A1, the condensing lens 44A makes the light emitted from the semiconductor light emitting device 52A be substantial parallel light slightly converging towards the optical axis Ax and inverts and illuminates the emitted light forward.

Figure 3:
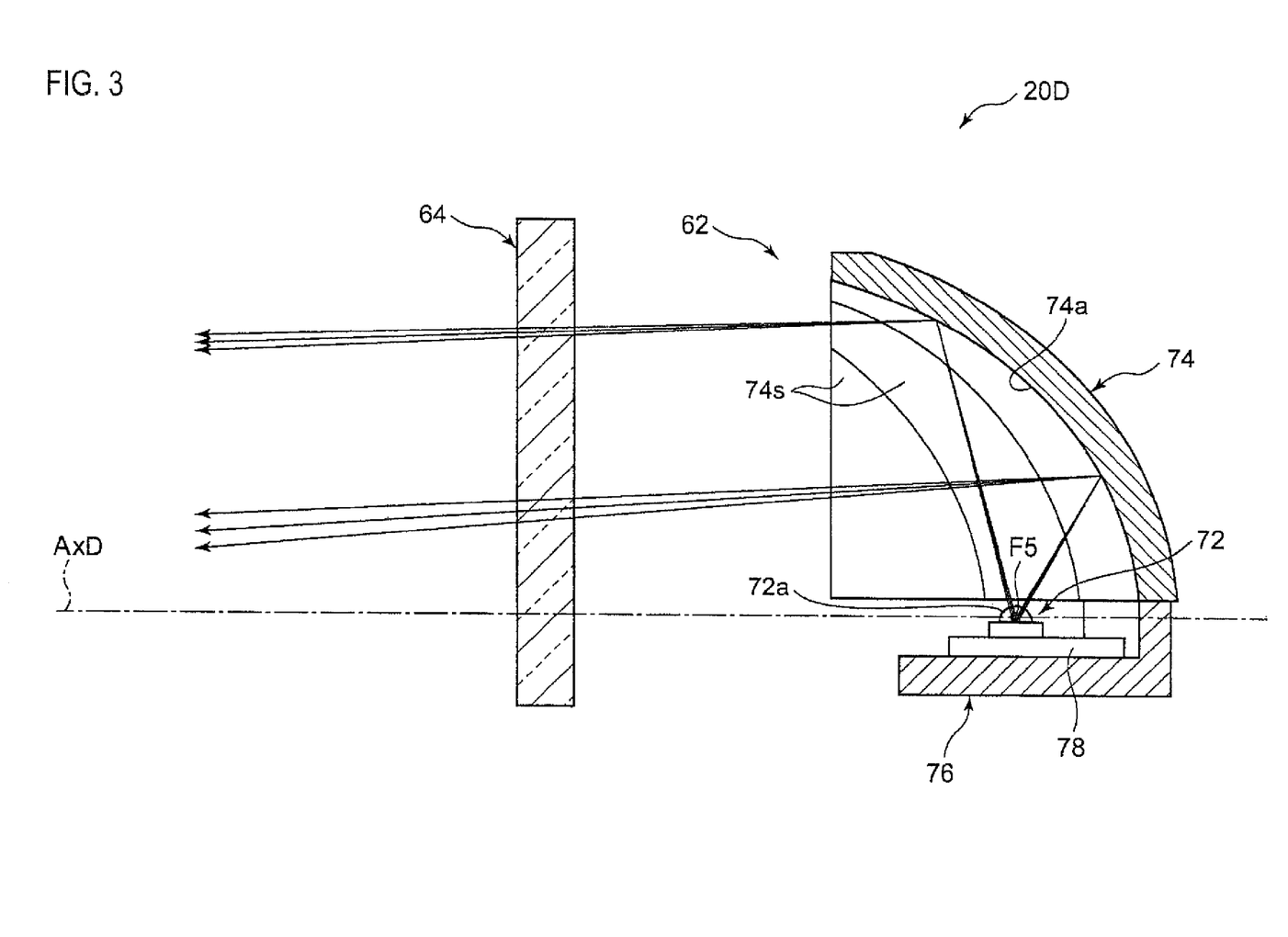
FIG. 3 is a side section view of a low beam diffusion unit taken along a line d-d in FIG. 1.

FIG. 3 is a side section view of the low beam diffusion unit 20D taken along a plane including a line d-d of FIG. 1 and extending in the front-rear direction of the vehicle. The low beam diffusion unit 20D has a semiconductor light emitting device 72 as a light source and a reflector 74.

The semiconductor light emitting device 72 is disposed on an optical axis AxD to be directed upward in the vertical direction. In this state, the semiconductor light emitting device 72 is fixed to a support member 76 via a substrate 78.

The reflector 74 is provided above the semiconductor light emitting device 72 and has a reflection surface 74a. In the reflection surface 74a, a plurality of diffuse reflection elements 74s are formed in vertical stripes on a substantial paraboloid of revolution that has the optical axis AxD as a central axis thereof and has a focal point F5 on the optical axis AxD at a slightly more rearward position than the semiconductor light emitting device 72. Left and right diffuse reflection angles of the diffuse reflection elements 74a are different. The reflector 74 is fixed to the support member 76 at a lower end portion thereof.

The low beam diffusion unit 20D is configured to reflect forward light emitted from the semiconductor light emitting device 72 by the reflector 74 as left-and-right diffusion light directing slightly downward and to illuminate the light forward of the lamp through a light transmission plate 64, as they are.

In the meantime, since the low beam large diffusion unit 20C also has the same configuration as that of the low beam diffusion unit 20D, detailed descriptions thereon will be omitted.

Figure 4:
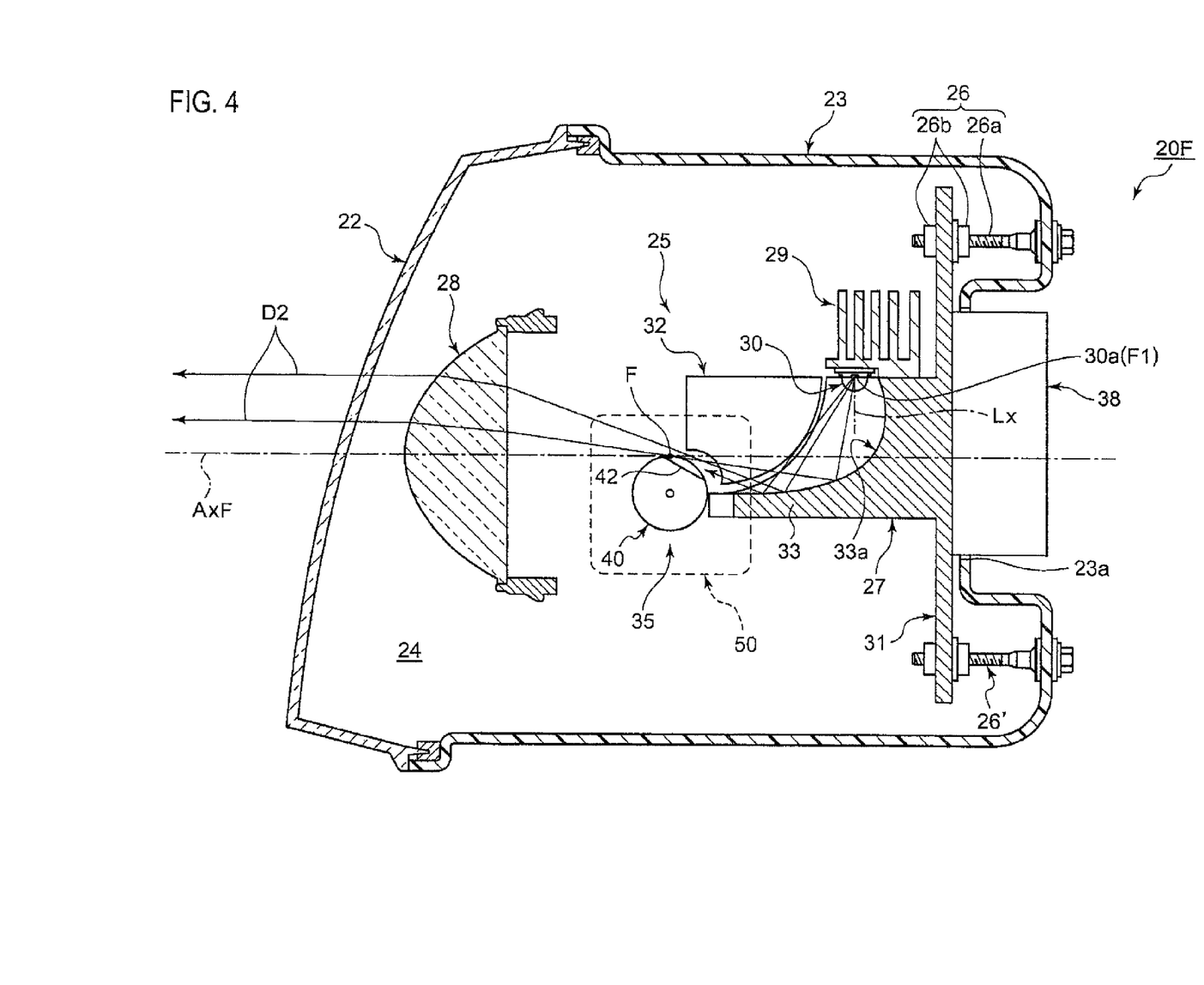
FIG. 4 is a schematic vertical section view of a condensing unit of a mechanical switching type taken along a line f-f in FIG. 1.

FIG. 4 is a schematic longitudinal section view of the mechanical-switching-type condensing unit 20F taken along a plane including a line f-f of FIG. 1 and extending in the front-rear direction of the vehicle.

As shown in FIG. 4, the condensing unit 20F has a lamp unit 25 in a lamp chamber defined and formed by a transparent outer cover 22 and a lamp body 23 of the multi-lamp type headlamp 20. The lamp unit 25 is supported by the lamp body 23 via aiming mechanisms 26, 26' each having an aiming screw 26a and an aiming screw 26b. The aiming mechanism 26 is a mechanism that adjusts fastening of the aiming nut 26b to thus finely adjust an attachment position of the lamp unit 25 and an attachment angle of the lamp unit 25. By the aiming adjustment, an optical axis AxF of the lamp unit 25 is changed in the front-and-rear direction of the vehicle or in the right and left directions of the vehicle. In the meantime, the upper aiming mechanism 26 corresponds to the aiming fulcrums M1, M2 in FIG. 1, and the lower aiming mechanism 26' corresponds to the aiming fulcrum M3 in FIG. 1.

The lamp unit 25 is a projector type lamp unit. The lamp unit 25 has a projection lens 28, a semiconductor light emitting device 30, a reflector 33, and a shade mechanism 35. The projection lens 28 is disposed on the optical axis AxF extending in the front-and-rear direction of the vehicle. The semiconductor light emitting device 30 is disposed in rear of a rear focal point F of the projection lens 28. The reflector 33 reflects forward light from each semiconductor light emitting device 30 while the light is slightly directed toward the optical axis AxF. The shade mechanism 35 is disposed between the projection lens 28 and the semiconductor light emitting device 30. The shade mechanism 35 shields a part of the light reflected from the reflector 33 and a part of the direct light from the semiconductor light emitting device 30 to thus form a cutoff line of a light distribution pattern.

The projection lens 28 is a plano-convex lens having a convex front surface and a planar rear surface. The projection lens 28 is configured to project forwards an image on a focus plane including the rear focal point F thereof, as an inverted image.

The semiconductor light emitting device 30 may be a white diode having a light emitting part 30a. The semiconductor light emitting device 30 is fixed to an LED support member 29 in a state where an illumination axis Lx thereof is directed in a vertically downward direction substantially perpendicular to the illumination direction (left direction in FIG. 4) of the lamp unit 25.

The reflector 33 is a reflection member that has an integrated reflection surface 33a having an optical axis AxF as a center thereof. The reflection surface 33a is a reflection surface having a substantially elliptical spherical shape formed by vapor deposition of aluminum on a part of a reflector main body 27 made of aluminum alloy, resin or the like.

The reflection surface 33a has a substantially elliptical section shape having a first focal point (F1) at a center position of the light emitting part 30a and a second focal point near the rear focal point F of the projection lens 28. The reflection surface 33a and the semiconductor light emitting device 30 are disposed so as to face each other. Therefore, the reflection surface 33a is configured to collectively reflect forwards light from the light emitting part 30a towards the optical axis AxF. Also, an eccentricity of the reflection surface 33a is set so that the eccentricity gradually increases from a vertical section to a horizontal section.

The LED support member 29 is attached and fixed to an upper surface of the reflector main body 27. A support frame 31 is fixed to a rear surface of the reflector main body 27. The support frame 31 is directly attached to the lamp body 23 of the multi-lamp type headlamp 20 via the aiming mechanisms 26. A rear surface of the support frame 31 is formed with a heat sink 38 that protrudes through an opening 23a formed on a backside of the lamp body 23. With this configuration, heat can be dissipated to the outside of the lamp body 23.

The shade mechanism 35 includes a rotary shade 40 and a rotary motor 50. The rotary shade 40 has a substantially cylindrical member. The substantially cylindrical member of the rotary shade 40 is disposed below and near the optical axis AxF and along a horizontal axis line extending in a vehicle body widthwise direction. The substantially cylindrical member of the rotary shade 40 is configured to be rotatable about the horizontal axis line. The rotary motor 50 serves as an actuator that rotates the rotary shade 40.

A notch part 42 is formed in a part of the rotary shade 40. Parts except the notch part 42 are formed to have a cylindrical surface so that a section shape of a ridge part thereof taken along a plane passing through a center of the cylinder continuously changes. Therefore, the rotary motor 50 rotates the rotary shade 40 to move the notch part 42 or an arbitrary part of the rotary shade 40 to a rear focal plane of the projection lens 28. Thereby, a light distribution pattern is formed on the virtual vertical screen in accordance with the shape of each ridge part (see FIGS. 6A to 6F).

A shade plate having ridge shapes which are different from each other and correspond to respective distribution patterns may be provided on the rotary shade. Also, in place of the rotary shade, the lamp unit 25 may have a configuration that moves the shade plate between an advance position and a retreat position near the focal point using an actuator such as motor or a solenoid.

Figure 5:
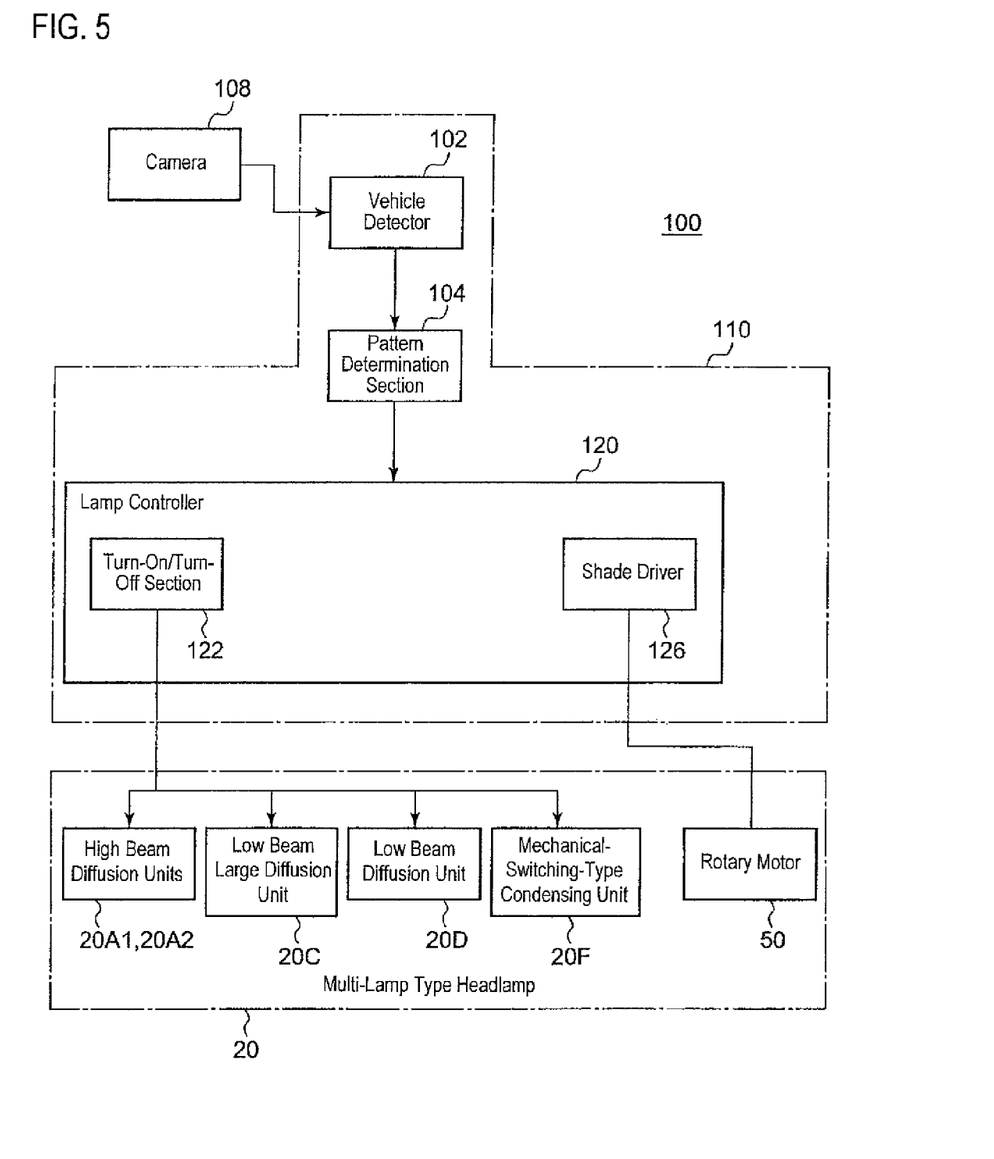
FIG. 5 is a configuration diagram of a vehicle headlamp system including the multi-lamp type headlamp and a control device that determines a light distribution pattern of the multi-lamp type headlamp.

FIG. 5 is a configuration diagram of a vehicle headlamp system 100 including the multi-lamp type headlamp 20 configured as described above and a control device 110 that determines a light distribution pattern of the multi-lamp type headlamp 20.

In FIG. 5, respective blocks shown in the control device 110 may be implemented by devices including a CPU of a computer and a memory in terms of hardware and may be implemented by computer programs loaded in a memory and the like in terms of software. Here, the respective blocks are drawn as functional blocks that are implemented with the cooperation of hardware and software. Therefore, one skilled in the art would appreciate that the functional blocks may be implemented in various manners by combining hardware and software.

A vehicle detector 102 executes predetermined image processing, such as target recognition processing, for image frames captured by a camera 108 such as stereo camera to detect a forward vehicle such as an oncoming vehicle and a preceding vehicle and/or a pedestrian and/or to detect a curvature of a road on which the vehicle is traveling.

A pattern determination section 104 determines an optimal light distribution pattern based on a position(s) of the vehicle and/or pedestrian and/or the curvature of the road detected by the vehicle detector 102, and instructs a lamp controller 120 to form the determined light distribution pattern. For example, when a preceding vehicle running in the same direction or an oncoming vehicle is detected ahead of the vehicle on which the vehicle headlamp 20 is mounted, the pattern determination section 102 determines to prevent glare and instruct to form a light distribution pattern for low beam or a split light distribution pattern. Also, when it is detected that there is no forward vehicle ahead of the vehicle on which the vehicle headlamp 20 is mounted, the pattern determination section 102 determines to improve visibility of a driver and instruct to form a light distribution pattern for high beam. The above control may be provided by an ADB (Adaptive Driving Beam) system.

The lamp controller 120 executes turn-on/turn-off control for the respective lamp units and/or control of forming the light distribution pattern in accordance with the instruction from the pattern determination section 104. The lamp controller 120 includes a turn-on/turn-off section 122 and a shade driver 126.

The turn-on/turn-off section 122 individually turns on/off the semiconductor light emitting devices 52A of the high beam diffusion units 20A, a light source (not shown) of the low beam large diffusion unit 20C, the semiconductor light emitting device 72 of the low beam diffusion unit 20D, and the semiconductor light emitting device 30 of the mechanical-switching-type condensing unit 20F in accordance with the instructed light distribution pattern.

The shade driver 126 drives the rotary motor 50 in the mechanical-switching-type condensing unit 20F to rotate the rotary shade 40 to a position corresponding to the instructed light distribution pattern.

Under various environments in which the vehicle mounted with the vehicle headlamp 20 travels, the vehicle headlamp system 100 can form an optimal combined light distribution pattern by overlapping the light distribution patterns formed by the respective lamp units. Examples of the combined light distribution pattern will be described with reference to FIGS. 6A to 6F. FIGS. 6A to 6F show light distribution patterns that are formed on the virtual vertical screen disposed at a position 25 meters ahead of the multi-lamp type headlamp 20. In FIGS. 6A to 6F, the individual light distribution patterns formed by the respective lamp units are denoted with the same reference numerals as those of the respective lamp units.

Figure 6A:
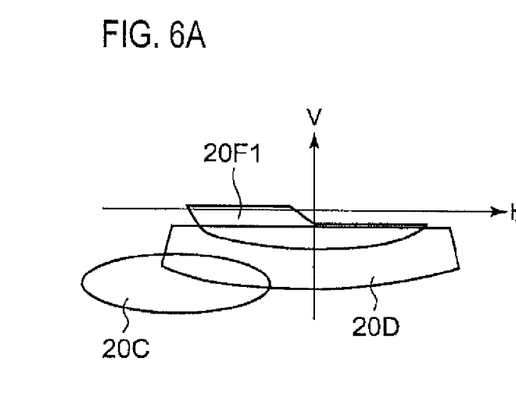
FIGS. 6A to 6F show combined light distribution patterns that are formed on a virtual vertical screen by the multi-lamp type headlamp according to one embodiment of the invention.

FIG. 6A shows a low beam combined light distribution pattern. An individual light distribution pattern 20F1 for low beam is formed by the mechanical-switching-type condensing unit 20F, and the low beam diffusion unit 20D and the low beam large diffusion unit 20C are turned on. Thereby, a region below the horizontal line H can be widely illuminated.

Figure 6B:
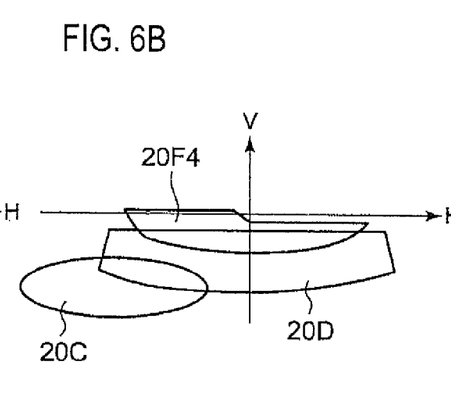

FIG. 6B shows a combined light distribution pattern for a motorway mode. A combined light distribution pattern 20F4 for a motorway mode is formed by the mechanical-switching-type condensing unit 20F, and the low beam diffusion unit 20D and the low beam large diffusion unit 20C are turned on.

Figure 6C:
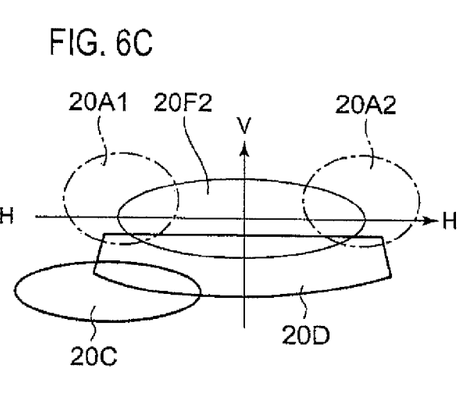

FIG. 6C shows a high beam combined light distribution pattern. An individual light distribution pattern 20F2 for high beam is formed by the mechanical-switching-type condensing unit 20F, and the two high beam diffusion units 20A1, 20A1, the low beam diffusion unit 20D and the low beam large diffusion unit 20C are turned on. Thereby, regions above and below the horizontal line H can be widely illuminated.

Figure 6D:
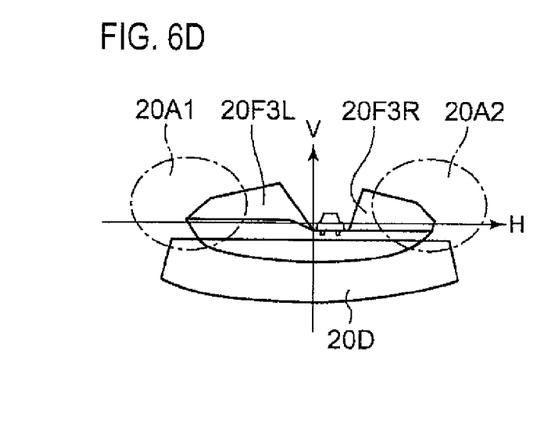

FIG. 6D shows a split combined light distribution pattern that is formed when an oncoming vehicle is at a long distance during execution of the ADB control. One-sided high individual light distribution pattern 20F3L is formed by the mechanical-switching-type condensing unit 20F, which is located on the left side of the vehicle, and one-sided high individual light distribution pattern 20F3R is formed by the mechanical-switching-type condensing unit 20F, which is located on the right side of the vehicle. Also, the two high beam diffusion units 20A1, 20A1 and the low beam diffusion unit 20D are turned on. Thereby, the split combined light distribution pattern having inclined cutoff lines on both sides of the oncoming vehicle is formed. Regions except the oncoming vehicle can be widely illuminated without glare being caused to a driver of the oncoming vehicle.

Figure 6E:
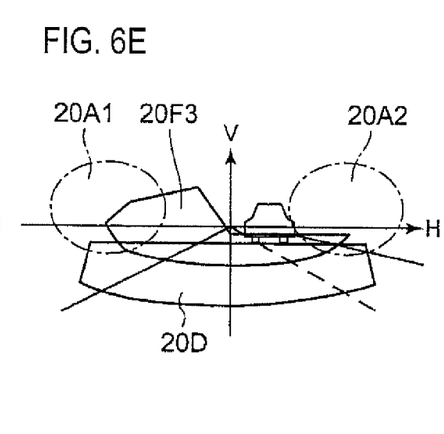

FIG. 6E shows a split combined light distribution pattern that is formed when an oncoming vehicle is at a closer position than that in the case of FIG. 6D during execution of the ADB control. One-sided high individual light distribution pattern 20F3L is formed by the mechanical-switching-type condensing unit 20F, which is located on the left side of the vehicle. Also, the mechanical-switching-type condensing unit 20F, which is located on the right side of the vehicle, is turned off. Furthermore, the two high beam diffusion units 20A1, 20A1 and the low beam diffusion unit 20D are turned on. Thereby, the split combined light distribution pattern having an inclined cutoff line on the left side of the oncoming vehicle and illuminating the right side of the oncoming vehicle by the high beam diffusion unit 20A2 is formed.

Figure 6F:
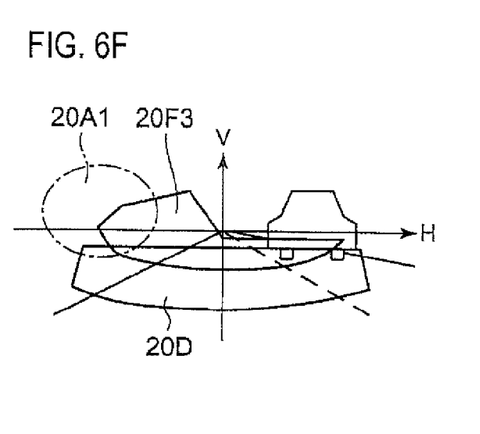

FIG. 6F shows a split combined light distribution pattern that is formed when the oncoming vehicle is at a further closer position than that in the case of FIG. 6E during execution of the ADB control. One-sided high individual light distribution pattern 20F3L is formed by the mechanical-switching-type condensing unit 20F, which is located on the left side of the vehicle. Also, the mechanical-switching-type condensing unit 20F, which is located on the right side of the vehicle, is turned off. Furthermore, the high beam diffusion unit 20A1 and the low beam diffusion unit 20D are turned on, and the high beam diffusion unit 20A2 is turned off Thereby, one-sided high combined light distribution pattern having an inclined cutoff line only on the left side of the oncoming vehicle is formed.

As shown in FIGS. 6A to 6F, the rotary shade 40 of the mechanical-switching-type condensing unit 20F is configured to form the cutoff line extending in the horizontal direction, the vertical direction, or the inclined direction in the light distribution pattern for low beam, the light distribution pattern for the motorway mode, the split light distribution pattern, and the one-sided high light distribution pattern. Also, as described above, the rotary shade 40 has the cylindrical surface so that the shape of the ridge part thereof continuously changes ridge part. Therefore, it is possible to continuously change the position of the cutoff line in the vicinity of the center of the virtual vertical screen. In other words, the mechanical-switching-type condensing unit 20F has the high resolution in the vicinity of the center of the virtual vertical screen.

Meanwhile, in regions except the vicinity of the center of the virtual vertical screen, an illuminated region is changed by turning on/off the high beam diffusion unit 20A, the low beam large diffusion unit 20C, and the low beam diffusion unit 20D. In other words, the resolutions of those lamp units are lower than that of the mechanical-switching-type condensing unit 20F.

Figure 7A:
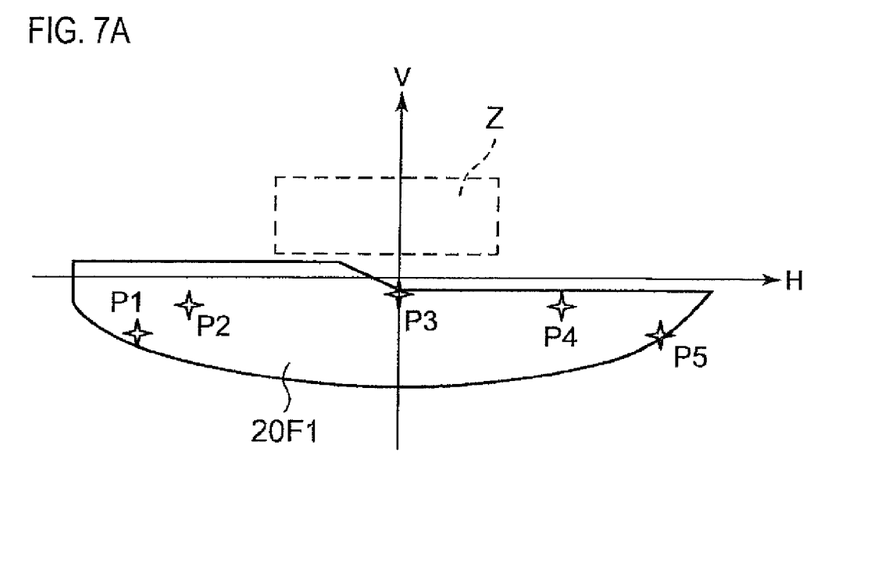
FIGS. 7A and 7B show examples of points for which regulations to be satisfied by light distribution patterns formed by the mechanical-switching-type condensing unit are stipulated.
Figure 7B:
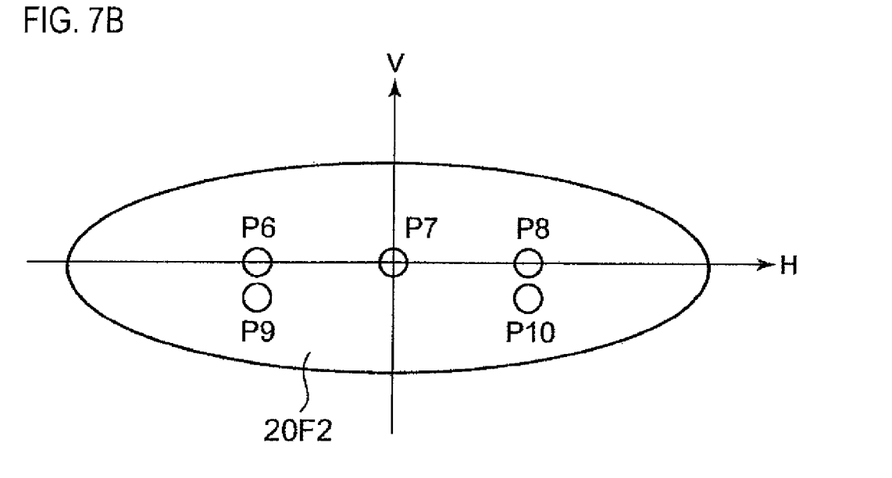

FIGS. 7A and 7B show examples of points (which will be referred to as "regulatory points") for which regulations to be satisfied by the individual light distribution patterns, which are formed by the mechanical-switching-type condensing unit 20F. FIG. 7A shows regulatory points for the individual light distribution pattern for low beam, which is formed by the mechanical-switching-type condensing unit 20F. FIG. 7B shows regulatory points for the individual light distribution pattern for high beam, which is formed by the mechanical-switching-type condensing unit 20F. In the following description, an "angle" means an angle formed between a central axis of a vehicle and a line connecting one point on the virtual vertical screen and a central point of the vehicle front part.

In FIG. 7A, a point P1 is located at a position (4D-20L) that is 4° below the horizontal line and 20° on the left side of the vertical line, and a lower limit value of illuminance is defined for the point P1. Likewise, a point P5 is located at a position (4D-20R) that is 4° below the horizontal line and 20° on the right side of the vertical line, and a lower limit value of illuminance is defined for the point P5.

A point P2 is located at a position (1.72D-16L) that is 1.72° below the horizontal line and 16° on the left side of the vertical line, and a lower limit value of illuminance is defined for the point P2. Also, a point P4 is located at a position (1.72D-11R) that is 1.72° below the horizontal line and 11° on the right side of the vertical line, and a lower limit value of illuminance is defined for the point P4.

A point P3 is located at a position (0.86D) that is 0.86° below the horizontal line, and a lower limit value of illuminance is defined for the point P3.

A zone Z is a region for restricting glare to an oncoming vehicle and a preceding vehicle when a low beam is formed. An upper limit value (for example, 1 lux) of illuminance is defined for the zone Z. Also, a lower limit value (for example, 0.1 lux) of illuminance is defined for the zone Z so as to illuminate an overhead sign.

In FIG. 7B, a point P6 is located at a position (12L) that is on the horizontal line and 12° on the left side of the vertical line. A lower limit value of illuminance is defined for the point Pb. Likewise, a point P8 is located at a position (12R) that is on the horizontal line and is 12° on the right side of the vertical line. A lower limit value of illuminance is defined for the point P8. A point P7 is located at an intersection point between the horizontal line and the vertical line. A lower limit value of illuminance is defined for the point P7. A point P9 is located at a position (2.5D-12L) that is 2.5° below the horizontal line and is 12° on the left side of the vertical line. A lower limit value of illuminance is defined for the point P9. Likewise, a point P10 is located at a position (2.5D-12R) that is 2.5° below the horizontal line and is 12° on the right side of the vertical line. A lower limit value of illuminance is defined for the point P10.

The vehicle headlamp 20 is configured so that all or most of the above regulatory points are satisfied by even only the mechanical-switching-type condensing unit 20F. Thereby, restrictions regarding illumination regions or illuminances of the lamp units other than the mechanical-switching-type condensing unit 20F are reduced. Therefore, the degrees of freedom of shapes of other lamp units, sizes of the other lamp units, and arrangement of the other lamp units in the headlamp are enhanced.

Then, description will be given as to how a combined light distribution pattern formed by a multi-lamp type headlamp according to a related art and that formed by the multi-lamp type headlamp according to this embodiment change during the ADB control.

Figure 8A:
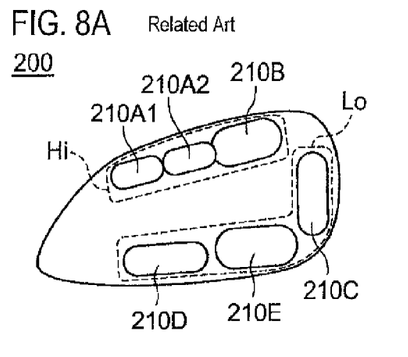
FIG. 8A is a schematic front view of a turn-on/turn-off type multi-lamp type headlamp of the related art.

FIG. 8A is a schematic front view of a multi-lamp type headlamp 200, employing a turn-on/turn-off type, of the related art. The multi-lamp type headlamp 200 includes high beam diffusion units 210A1, 210A2, a high beam condensing unit 210B, a low beam large diffusion unit 210C, a low beam diffusion unit 210D and a low beam condensing unit 210E.

Figure 8B:
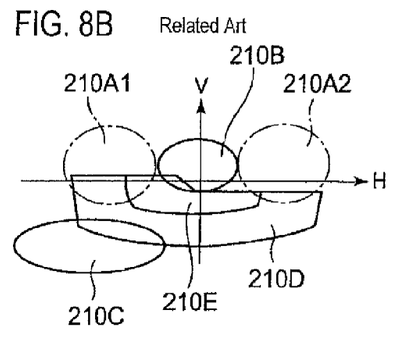
FIG. 8B shows one example of light distribution patterns formed by respective lamp units of the headlamp shown in FIG. 8A.

FIG. 8B shows an example of light distribution patterns formed by the respective lamp units of the multi-lamp type headlamp 200. In FIGS. 8B to 8F and 9, the respective lamp units and the illumination regions thereof are denoted with the same reference numerals.

As shown in FIG. 8B, in the multi-lamp type headlamp 200, the high beam condensing unit 210B is configured to illuminate a central region of a high beam, and the low beam condensing unit 210E is configured to illuminate a central region of a low beam. The high beam diffusion units 210A1, 210A2, the low beam large diffusion unit 210C, and the low beam diffusion unit 210D are similar to those described with reference to FIG. 1.

Figure 8C:
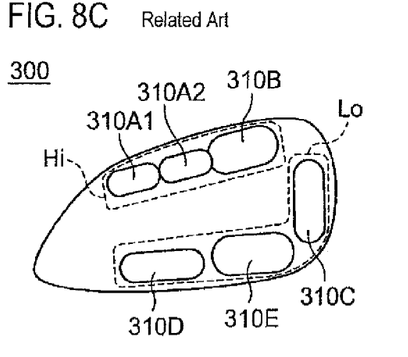
FIG. 8C is a schematic front view of a swivel type multi-lamp type headlamp of the related art.

FIG. 8C is a schematic front view of a multi-lamp type headlamp 300, employing a swivel type, of the related art. The multi-lamp type headlamp 300 includes high beam diffusion units 310A1, 310A2, a swivel switching unit 310B, a low beam large diffusion unit 310C, a low beam diffusion unit 310D, and a low beam condensing unit 310E. The swivel switching unit 310B is configured to swivel its optical axis in the right and left directions.

Figure 8D:
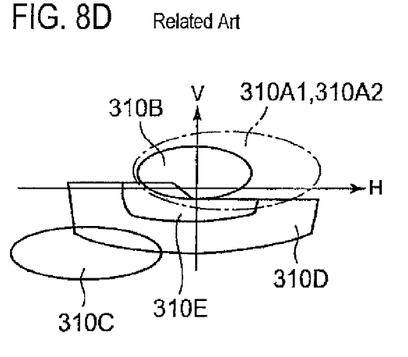
FIG. 8D shows one example of a light distribution pattern formed by respective lamp units of the headlamp shown in FIG. 8C.

FIG. 8D shows an example of light distribution patterns formed by the respective lamp units of the multi-lamp type headlamp 300. As shown in FIG. 8D, in the multi-lamp type headlamp 300, the swivel switching unit 310B is configured to illuminate a central region of a high beam, and the low beam condensing unit 310E is configured to illuminate a central region of a low beam. The high beam diffusion units 310A1, 310A2 widely illuminate a high beam region. The low beam large diffusion unit 310C and the low beam diffusion unit 310D are similar to those described with reference to FIG. 1.

Figure 8E:
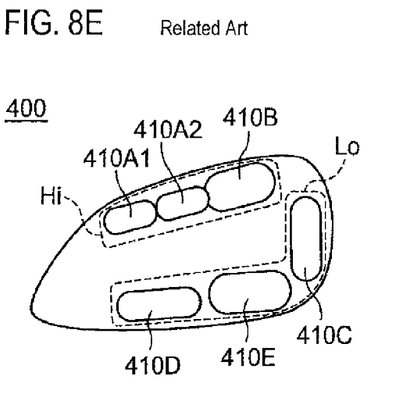
FIG. 8E is a schematic front view of a rotation shade type multi-lamp type headlamp of the related art.

FIG. 8E is a schematic front view of a multi-lamp type headlamp 400, employing a rotation shade type, of the related art. The multi-lamp type headlamp 400 includes high beam diffusion units 410A1, 410A2, a high beam condensing unit 410B, a low beam large diffusion unit 410C, a low beam diffusion unit 410D, and a rotation shade switching unit 410E. The rotation shade switching unit 410E is configured to switch a plurality of shades, to thereby change a light distribution pattern.

Figure 8F:
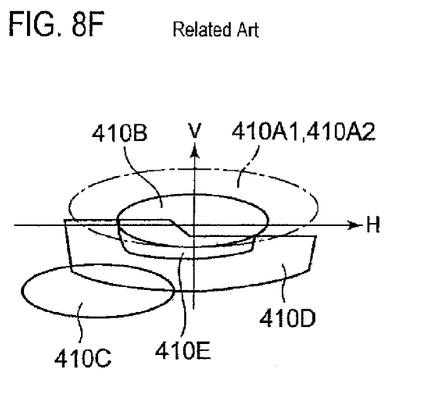
FIG. 8F shows one example of a light distribution pattern formed by respective lamp units of the headlamp shown in FIG. 8E.

FIG. 8F shows an example of light distribution patterns formed by the respective lamp units of the multi-lamp type headlamp 400. As shown in FIG. 8F, in the multi-lamp type headlamp 400, the high beam condensing unit 410B is configured to illuminate a central region of a high beam, and the rotation shade switching unit 410E is configured to illuminate a central region of a low beam. The high beam diffusion units 410A1, 410A2 widely illuminate a high beam region. The low beam large diffusion unit 410C and the low beam diffusion unit 410D are similar to those described with reference to FIG. 1.

Figure 9:
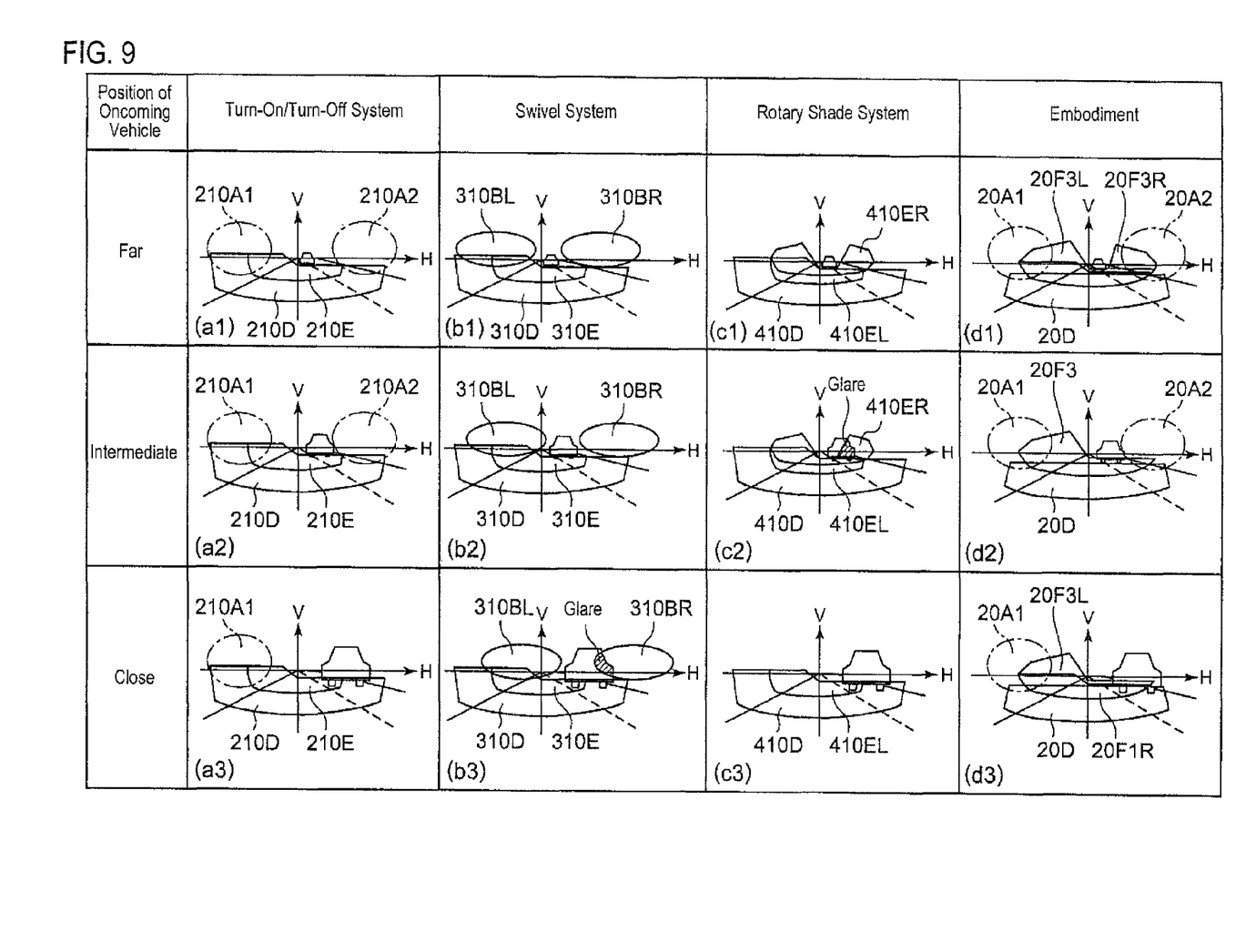
FIG. 9 is a diagram comparing combined light distribution patterns that are respectively formed by the multi-lamp type headlamp of the turn-on/turn-off type, the multi-lamp type headlamp of the swivel type, the multi-lamp type headlamp of the rotation shade type and the multi-lamp type headlamp of the embodiment of the invention when ADB control is executed.

FIG. 9 is a diagram comparing the combined light distribution patterns that are respectively formed by (a) the multi-lamp type headlamp 200 employing the turn-on/turn-off type, (b) the multi-lamp type headlamp 300 employing the swivel type, (c) the multi-lamp type headlamp 400 employing the rotation shade type, and (d) the multi-lamp type headlamp 20 of this embodiment during execution of the ADB control. Meanwhile, the combined light distribution patterns formed by the multi-lamp type headlamp 20 in FIG. 9 are the same as those shown in FIGS. 6D to 6F.

First, referring to (a1) to (a3) in FIG. 9, the multi-lamp type headlamp 200 employing the turn-on/turn-off type will be described. The multi-lamp type headlamp 200 should cope with a change in a position of a preceding vehicle and/or an oncoming vehicle only by turning on/off the respective lamp units. Therefore, when the oncoming vehicle is at a long distance (see (a1) in FIG. 9), for example, the high beam diffusion units 210A1, 210A2 are turned on and the high beam condensing unit 210B is turned off, so that glare to the oncoming vehicle is prevented. The same control is performed when the oncoming vehicle is at an intermediate distance (see (a2) in FIG. 9). When the oncoming vehicle is at a short distance (see (a3) in FIG. 9), the high beam diffusion unit 210A1 is further turned off to prevent the glare to the oncoming vehicle.

As can be seen from (a1) to (a3) in FIG. 9, when the ADB control is executed in the multi-lamp type headlamp 200 employing the turn-on/turn-off type, the resolution in the horizontal direction (i.e., a change amount by which an area of the illumination region is changed in the horizontal direction) becomes very coarse. In order to enhance the resolution, it is necessary to increase the number of the high beam diffusion units, which in turn increases the cost.

Then, referring to (b1) to (b3) in FIG. 9, the multi-lamp type headlamp 300 employing the swivel type will be described. The multi-lamp type headlamp 300 swivels the swivel switching units 310B on the left and right sides in the right and left directions of the illumination region to cope with, a change in a position of a preceding vehicle and/or an oncoming vehicle. For example, as the oncoming vehicles comes close from a long distance to a short distance, illumination regions 310BL, 310BR of the left and right swivel switching units are swiveled rightwards. At this time, when the swivel speed does not follow the approach speed of the oncoming vehicle and the swivel is delayed, glare is caused to a driver of the oncoming vehicle as shown in (b3) of FIG. 9. Also, since it is necessary to provide a motor for swivel in the swivel switching unit 310B, there are restrictions on the design thereof.

Finally, referring to (c1) to (c3) in FIG. 9, the multi-lamp type headlamp 400, employing the rotation shade type will be described. In the multi-lamp type headlamp 400, the rotation shade switching units 410E on the left and right sides switch the shape of the shades to cope with a change in a position of a preceding vehicle and/or an oncoming vehicle. As shown in (c1) of FIG. 9, when the oncoming vehicle is at a long distance, a split light distribution pattern is formed by the left and right rotation shade switching units 410EL, 410ER. When the oncoming vehicle is at a short distance, a one-sided high light distribution pattern is formed by the left and right rotation shade switching units 410EL, 410ER as shown in (c3) of FIG. 9. At this time, when the switching speed of the rotation shade does not follow the approach speed of the oncoming vehicle, glare may be caused to a driver of the oncoming vehicle as shown in (c2) of FIG. 9. Also, in the rotation shade type, a region within which the multi-lamp type headlamp can follow movement of a forward vehicle in the right and left directions are limited (for example, about 5° in the left and right directions, respectively).

To the contrary, in the multi-lamp type headlamp 20 of this embodiment, when an oncoming vehicle is at a long distance, the split combined light distribution pattern is fanned by the mechanical-switching-type condensing units 20FL, 20FR on the right and left sides of the vehicle as shown in (d1) of FIG. 9, but when the oncoming vehicle is at an intermediate distance, the combined light distribution pattern is formed by the mechanical-switching-type condensing unit 20FL on the left side of the vehicle and the high beam diffusion unit 20A2 as shown in (d2) of FIG. 9. When the oncoming vehicle further comes closer, the high beam diffusion unit 20A2 is turned off, so that the one-sided high combined light distribution can be formed. Since the switching from (d2) of FIG. 9 to (d3) of FIG. 9 can be realized just by turning off the high beam diffusion unit 20A2, there is little concern that the following to the oncoming vehicle is delayed as in the swivel type and rotation shade type. Also, a region in which the multi-lamp type headlamp 20 can follow movement of a forward vehicle in the left and right directions is wide.

As described above, in the multi-lamp type headlamp of this embodiment, the mechanical-switching-type condensing units, which can finely switch the position of the cutoff line in the light distribution pattern (that is, which has a high resolution), illuminate the vicinity of the center of the virtual vertical screen for which a high luminous intensity is required. Also, the lamp units, which can rapidly switch the illumination regions by the turn-on/turn-off control, illuminate surrounding regions thereof. Specifically, the illumination region by the mechanical-switching-type condensing unit is higher in luminous intensity than the illumination regions by the high beam diffusion units. The illumination region by the mechanical-switching-type condensing unit may be higher than in luminous intensity than those by the low beam large diffusion unit and the low beam diffusion unit. With this configuration, while it is possible to rapidly cope with the change of the illumination region during the execution of the ADB control in the surrounding regions, it is possible to make the illumination region finely follow the change in the position of the forward vehicle in the vicinity of the center.

Also, the mechanical-switching-type condensing units illuminate the vicinity of the center of the virtual vertical screen for which various regulations are stipulated in accordance with the laws and regulations of the respective countries. Thereby, it is possible to reduce the restriction(s) on the illumination regions and/or illuminances of the other lamp units. Therefore, it is possible to reduce the cost of the lamp units other than the mechanical-switching-type condensing units and to increase the degrees of freedom of shapes of the other lamps, sizes of the other lamps and arrangements of the other lamps in the headlamp.

Also, according to this embodiment, of the lamp units making up the multi-lamp type headlamp, each mechanical-switching-type condensing unit provides, with a single lamp, coverage of the illumination regions (i.e., regions that are illuminated with the low/high beams) largely influenced by the regulations concerning the light distribution, and only the mechanical-switching-type condensing units are provided with the aiming mechanisms for optical axis adjustment in the upper and lower directions and/or the right and left directions. Thereby, when the optical axis of the low/high beams is adjusted, only the mechanical switching type condensing units are adjusted, so that it is possible to easily perform the adjustment operation. Also, since it is not necessary to provide the optical axis adjusting function to the other lamp units, it is possible to reduce the cost and sizes of the other lamp units and to increase the degrees of freedom of the shapes of the other lamp units and arrangements of the other lamp units in the headlamp.

It should be noted that the invention is not limited to the above described embodiments. The respective embodiments may be combined or variously modified, such as design change, based on the knowledge of one skilled in the art. The combined or modified embodiment is also included in the invention. New embodiments that are provided by combining the embodiments or combining the embodiments and modified embodiments described below also have respective effects of the combined embodiments and modified embodiments.

In the above embodiment, the mechanical-switching-type condensing unit using the rotation shade has been exemplarily described as a first lamp unit having a high resolution. However, a lamp unit having the configuration that a shade plate is moved between an advance position and a retreat position in the vicinity of the focal point of the projection lens or a lamp unit having the configuration that an illumination region is changed by a MEMS or a liquid crystal shutter may be used.

In the above embodiment, only each mechanical-switching-type condensing unit is provided with the aiming mechanism for optical axis adjustment. However, instead of the aiming mechanism, a leveling mechanism or a swivel mechanism may be provided to only each mechanical-switching-type condensing unit so as to adjust the optical axis.

What is claimed is:

1. A vehicle headlamp comprising:
   a first lamp unit configured to form at least a cutoff line of a light distribution pattern for a low beam; and
   a second lamp unit having a resolution that is lower than that of an illumination region which can be provided by the first lamp unit, wherein
   the vehicle headlamp is configured to combine illumination by the first lamp unit and illumination by the second lamp unit so as to provide a high beam light distribution function and a low beam light distribution function.

2. The vehicle headlamp according to claim 1, wherein
   the first lamp unit is configured to continuously change a position of the cutoff line, and
   the second lamp unit is configured to change the illumination region in a stepwise manner.

3. The vehicle headlamp according to claim 1, wherein
   the first lamp unit is configured to change a position of the cutoff line by driving an actuator, and
   the second lamp unit is configured to change the illumination region by individually turning on/off one or more sub lamp units.

4. The vehicle headlamp according to claim 2, wherein
   the first lamp unit is configured to change a position of the cutoff line by driving an actuator, and
   the second lamp unit is configured to change the illumination region by individually turning on/off one or more sub lamp units.

5. The vehicle headlamp according to claim 1, wherein the illumination region by the first lamp unit is higher in luminous intensity than an illumination region by the second lamp unit.

6. The vehicle headlamp according to claim 2, wherein the illumination region by the first lamp unit is higher in luminous intensity than an illumination region by the second lamp unit.

7. The vehicle headlamp according to claim 3, wherein the illumination region by the first lamp unit is higher in luminous intensity than an illumination region by the second lamp unit.

8. The vehicle headlamp according to claim 1, wherein the illumination region by the first lamp unit includes a vicinity of a center of a virtual vertical screen that is arranged ahead of a vehicle.

9. The vehicle headlamp according to claim 2, wherein the illumination region by the first lamp unit includes a vicinity of a center of a virtual vertical screen that is arranged ahead of a vehicle.

10. The vehicle headlamp according to claim 3, wherein the illumination region by the first lamp unit includes a vicinity of a center of a virtual vertical screen that is arranged ahead of a vehicle.

11. The vehicle headlamp according to claim 7, wherein the illumination region by the first lamp unit includes a vicinity of a center of a virtual vertical screen that is arranged ahead of a vehicle.

12. The vehicle headlamp according to claim 1, wherein the illumination region by the first lamp unit includes both a region that should be illuminated when the high beam light distribution function is executed and a region that should be illuminated when the low beam light distribution function is executed.

13. The vehicle headlamp according to claim 2, wherein the illumination region by the first lamp unit includes both a region that should be illuminated when the high beam light distribution function is executed and a region that should be illuminated when the low beam light distribution function is executed.

14. The vehicle headlamp according to claim 3, wherein the illumination region by the first lamp unit includes both a region that should be illuminated when the high beam light distribution function is executed and a region that should be illuminated when the low beam light distribution function is executed.

15. The vehicle headlamp according to claim 7, wherein the illumination region by the first lamp unit includes both a region that should be illuminated when the high beam light distribution function is executed and a region that should be illuminated when the low beam light distribution function is executed.

16. The vehicle headlamp according to claim 11, wherein the illumination region by the first lamp unit includes both a region that should be illuminated when the high beam light distribution function is executed and a region that should be illuminated when the low beam light distribution function is executed.

* * * * *